Sept. 28, 1948.    M. D. SANDERS    2,450,398
FLOTATION OF BONE PARTICLES
Filed April 3, 1944
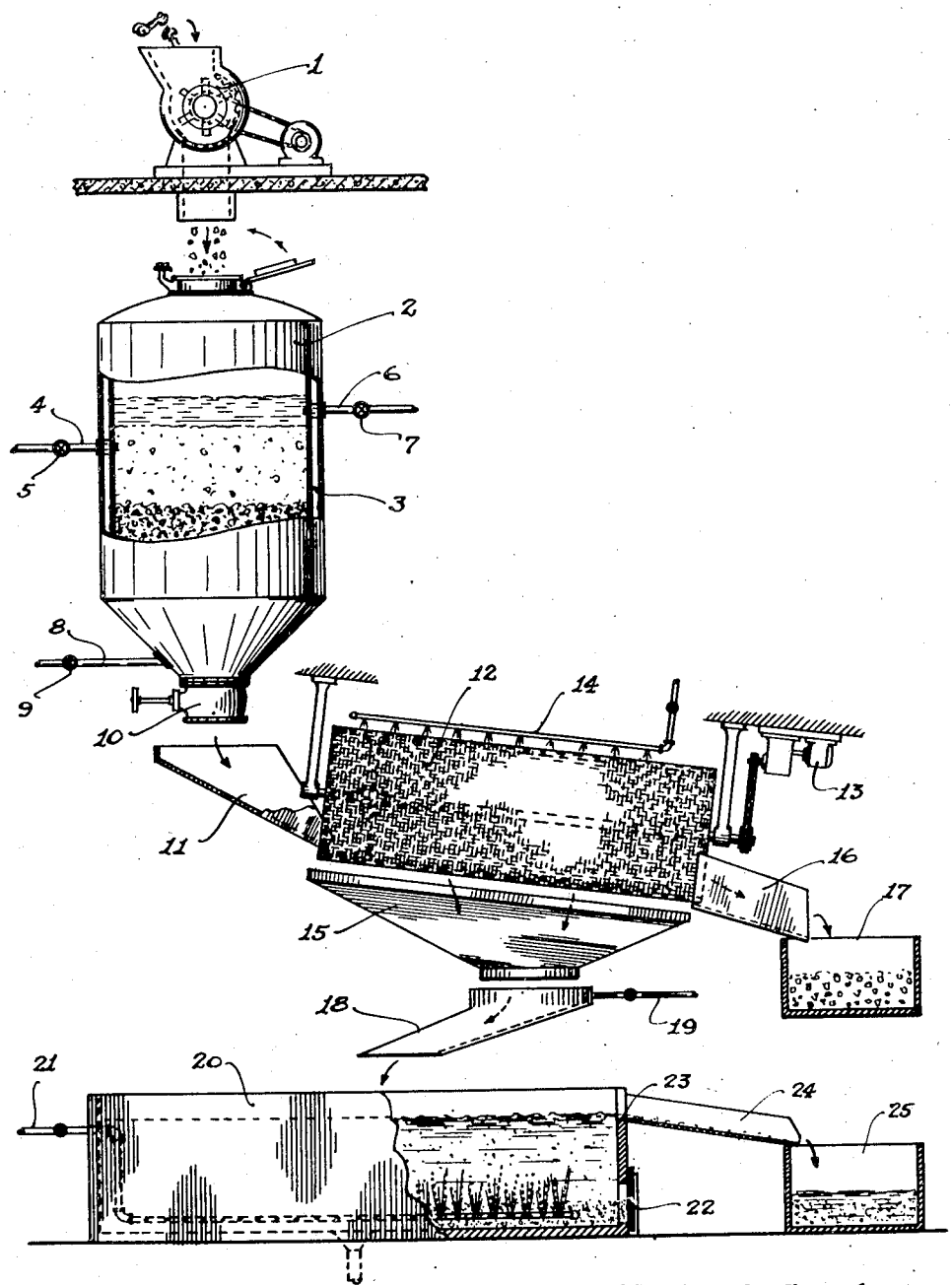
Marion D. Sanders
INVENTOR
ATTEST- Patented Sept. 28, 1948

2,450,398

UNITED STATES PATENT OFFICE 2,450,398

FLOTATION OF BONE PARTICLES

Marion D. Sanders, Washington, D. C., assignor to Swift & Company, Chicago, Ill., a corporation of Illinois Application April 3, 1944, Serial No. 529,381

5 Claims. (Cl. 209—155)

This invention relates to the manufacture of bone meal and has to do particularly with an improved method for classifying bone products from the slaughtering of animals.

In the bone meal industry, animal bone scrap is conventionally classified into feed bone stock and fertilizer bone stock. The scrap recovered from the rendering tank is ordinarily subjected to a screening process while agitated and drenched in a water spray to effect a separation of relatively large particles high in calcium phosphates from smaller particles high in proteins and fatty material. The relatively large particles are subsequently dried and ground for use as special feed bone meal. The fines, including bone, nitrogenous matter, meat and fatty constituents are washed from the large particles by a tumbling action and are kiln dried for use in fertilizer bone meal. Due to the tendency of bone material to splinter on crushing and disintegrate in the rendering tank, it is virtually impossible to secure uniform particle size in the crushed bone and, accordingly, an appreciable quantity of the feed bone stock passes into the catch basin along with the fertilizer bone stock. Because of the higher market value and greater utility of the feed bone stock, it is usually desirable to effect as large a recovery as possible thereof. Also, in order to enhance the value of both products, it is highly desirable to decrease the amount of nitrogenous matter in the feed bone and increase the amount of nitrogenous matter in the fertilizer bone.

In accordance with the present invention, bones obtained from slaughtered animals, including constituents high in calcium phosphates and constitutents high in proteins and fatty materials, are mixed with a fluid medium. The mixture is subjected to vigorous agitation in a classifying zone to cause the hydraulic separation of the constituents high in calcium phosphates from the constituents high in proteins and fatty materals. The latter are removed from the classifying zone while suspended in the fluid medium by decantation.

According to a preferred method of operation, the crushed bone material recovered from the rendering tank is screened to secure an initial separation of a major portion of coarse constituents high in calcium phosphates which are suitable as feed bone stock. The fines from the screening operation are agitated in a fluid medium to recover a substantial additional quantity of constituents high in calcium phosphates which may then be combined with the major portion. The whole is then dried and ground to produce high quality special feed bone meal.

The bone stock to be hydraulically classified may be mixed with at least an equal quantity of a fluid medium such as water and the mixture continuously introduced into the classifying zone at one point. The constituents high in protein and fatty materials may be continuously removed from the classifying zone at another point as a suspension in the fluid medium suitable for drying and grinding into high grade fertilizer bone meal. The constituents high in calcium phosphate collect in the bottom of the classification zone and may be removed therefrom, as they accumulate, in any suitable manner.

The invention will be more clearly understood from the following description taken in connection with the accompanying drawing. The raw bone stock from the slaughter house is passed through a grinder 1 to crush the bone stock to a particle size of about 2 inches in diameter. The crushed bone stock, together with the proper amount of water, is introduced into a rendering tank 2 wherein the mixture is subjected to a cooking process to cause the extraction of glue liquor and a large portion of the fatty material. The rendering tank may be heated to a rendering temperature by steam jacket 3. Water may be supplied to the tank through a conduit 4 and valve 5. At the completion of the rendering process, the fat layer is removed from the top of the tank through a conduit 6 and valve 7 and the glue liquor is withdrawn at a point near the bottom of the tank through the conduit 8 and valve 9. The extracted bone material is withdrawn at the bottom of the rendering tank through a gate valve 10 and charged via hopper 11 into one end of an inclined rotary screen 12 which is driven by a motor 13. The crushed bone material passes along the rotary screen and is subjected to the washing action of a water spray 14. As a result of the combined effects of tumbling and washing, the larger particles are washed free of smaller pieces of bone and protein which pass through the meshes of the screen into a catch basin 15. The larger particles substantially free from adherent proteins and fatty materials remain on the screen and are discharged therefrom into a trough 16. The products in the trough are collected in a receptacle 17 to be ground into high grade special feed bone meal.

The fines from the screening operation including smaller bone particles, nitrogenous matter, meat, fatty constituents and wash water may be transferred from the catch basin 15 by a trough 18 to one end of the classification zone 20. The product in the trough 18 may be diluted with the desired amount of water from line 19. The classification zone consists of an elongated, relatively narrow receptacle provided with a perforated pipe 21 which is connected with a source of high pressure air. The fluid slurry may be maintained in a continuous state of agitation by introducing air from pipe 21 throughout the length of the classifying receptacle. The particles high in calcium phosphates are thus caused to separate from the particles high in proteins and fatty material and settle to the bottom from which they may be periodically removed through a trap 22. Alternatively, two or more classifying receptacles may be arranged in parallel, and the settlings removed from one while classifying a fresh charge in the other. The particles high in proteins and fatty materials remain in a state of suspension in the fluid medium and are discharge over a dam 23 into trough 24 and thence into settling box 25. The material collected in the settling box is substantially reduced in calcium phosphate content and suitable to be dried and ground to high grade fertilizer bone meal without further treatment.

It is understood that the screening step may be omitted and the extracted bone material directly subjected to hydraulic classification.

Generally, when the screening step is employed, approximately from about 4 per cent to 34 per cent of the rendered bone is recovered as fines for treatment in accordance with the invention. Of course, the quantity passing through the screen depends upon a number of factors, such as particle size, screen gauge, and quality of the bone.

Also, it is contemplated that means other than air may be employed for agitating the slurry during the process, for example, a mechanical stirrer.

An outstanding result of hydraulic classification by the process is the recovery of over 50 per cent of constituents high in calcium phosphates heretofore included in fertilizer bone meal. Also, the complete elimination of nitrogenous matter in the feed bone stock results in a product of high purity and greatly increased value.

*Example*

Raw bones were ground to a particle size of about 2 inches in diameter and subjected to a rendering process for the recovery of fat and glue liquor. The extracted bone was then screened while subjected to a powerful water spray to separate the coarse particles of bone. A sample of the fines from the screening operation was removed and subjected to hydraulic classification for the recovery of calcium phosphate values with the following results:

|  | Original Sample | | Residue after classification | | Settlings from Wash Water | |
| --- | --- | --- | --- | --- | --- | --- |
|  | Wet Basis | Dried | Wet Basis | Dried | Wet Basis | Dried |
| Weight_____g__ | 3,812 | 1,720 | 1,679 | 924 | 3,900 | 573 |
| $H_2O$_____percent__ | 55 | 0.75 | 45.4 | 0.85 | 85.5 | 1.3 |
| Fat_____ | 4.42 | 9.75 | 2.10 | 3.80 | 1.87 | 12.75 |
| BPL_____ | 26.75 | 58.96 | 42.60 | 77.42 | 6.95 | 47.28 |
| $NH_3$_____ | 1.32 | 2.90 | 0.57 | 1.04 | 0.62 | 4.22 |
| Yield, basis original sample percent__ | | | | 54 | | 33.3 |

It is observed that 58.96 per cent of the sample weighting 1720 g. on the dry basis consisted of bone phosphate of lime, which would ordinarily be included in fertilizer bone meal stock. When subjected to hydraulic classification by the present process, 924 g. were recovered from the fertilizer stock, 77.42 per cent of which consisted of bone phosphate of lime. This amounted to 70.5 per cent of the total bone phosphate of lime content in the original sample. The dried residue amounting to a yield of 54 per cent is suitable for the manufacture of special feed bone meal without further treatment.

It is to be understood that various changes may be made in the detailed procedure herein outlined without departing from the spirit and scope of the invention.

I claim:

1. In a method of classifying bone scrap material rich in calcium phosphate and having protein, fat, and other matter mixed therewith wherein the components rich in calcium phosphate are separated from the protein, fat, and other matter by crushing the said bone scrap to a particle size approximately 2 inches in diameter prior to rendering, thereafter separating the fat, glue liquor, and coarse bone scrap from the rendered crushed bone scrap fines, and subjecting the said fines to a hydraulic classifying process to recover a substantial quantity of the material rich in calcium phosphate, the improvement which comprises: submerging the said fines containing components rich in calcium phosphate and protein matter having a specific gravity greater than water in an elongated, relatively narrower, classifying zone containing a liquid aqueous medium; maintaining the entire contents of the classifying zone in a state of continuous, vigorous agitation by introducing therein air under high pressure, the major portion of the said protein matter being suspended in the upper portion of the classifying zone without suspending in the said upper zone more than a minor proportion of the components rich in calcium phosphate; decanting the suspended protein matter from the upper portion of the classifying zone; and collecting the components rich in calcium phosphate remaining in the lower portion of the classifying zone.

2. In a method of classifying bone scrap material rich in calcium phosphate and having protein, fat, and other matter mixed therewith wherein the components rich in calcium phosphate are separated from the protein, fat, and other matter by crushing the said bone scrap to a particle size approximately 2 inches in diameter prior to rendering, thereafter separating the fat, glue liquor, and coarse bone scrap from the rendered crushed bone scrap fines, and subjecting the said fines to a hydraulic classifying process to recover a substantial quantity of the material rich in calcium phosphate, the improvement which comprises: submerging the said crushed bone scrap fines containing components rich in calcium phosphate and protein matter having a specific gravity greater than water in a classifying zone containing a liquid aqueous medium; maintaining the entire contents of the classifying zone in a state of continuous, vigorous agitation by providing an upward flow of gaseous fluid in said classifying zone, the major portion of the said protein matter being suspended in the upper portion of the classifying zone without suspending in the said upper zone more than a minor proportion of the components rich in calcium phosphate; decanting the suspended protein matter from the upper portion of the classifying zone; and collecting the components rich in calcium phosphate remaining in the lower portion of the classifying zone.

3. In a method of classifying bone scrap material rich in calcium phosphate and having protein, fat, and other matter mixed therewith wherein components rich in calcium phosphate are separated from the protein, fat, and other matter by crushing the bone scrap to a desired particle size prior to rendering, thereafter separating the fat and glue liquor from the rendered crushed bone scrap, and further treating the said bone scrap to remove protein matter therefrom, the improvement which comprises: submerging the said crushed bone scrap containing components rich in calcium phosphate and protein matter having a specific gravity greater than water in a classifying zone containing a liquid aqueous medium; maintaining the entire contents of the said classifying zone in a state of continuous, vigorous agitation by providing an upward flow of gaseous fluid in said classifying zone, the major portion of the said protein matter being suspended in the upper portion of the classifying zone without suspending in the said upper zone more than a minor proportion of the components rich in calcium phosphate; decanting the suspended protein matter from the upper portion of the classifying zone; and collecting the components rich in calcium phosphate remaining in the lower portion of the classifying zone.

4. In a method of classifying bone scrap material rich in calcium phosphate and having protein, fat, and other matter mixed therewith wherein components rich in calcium phosphate are separated from the protein, fat, and other matter by crushing the bone scrap to a desired particle size prior to rendering, thereafter separating the fat, glue liquor, and coarse bone scrap from the rendered crushed bone scrap fines, and subjecting the said fines to a hydraulic classifying process to recover a substantial quantity of the material rich in calcium phosphate, the improvement which comprises: submerging the said crushed bone scrap fines containing components rich in calcium phosphate and protein matter having a specific gravity greater than water in a classifying zone containing a liquid aqueous medium; maintaining the entire contents of the classifying zone in a state of continuous, vigorous agitation by providing an upward flow of gaseous fluid in said classifying zone, the major proportion of the said protein matter being suspended in the upper portion of the classifying zone without suspending in the said upper zone more than a minor proportion of the components rich in calcium phosphate; decanting the suspended protein matter from the upper portion of the classifying zone; and collecting the components rich in calcium phosphate remaining in the lower portion of the classifying zone.

5. In a method of classifying bone scrap material rich in calcium phosphate and having protein, fat, and other matter mixed therewith wherein components rich in calcium phosphate are separated from the protein, fat, and other matter by crushing the bone scrap to a desired particle size prior to rendering, thereafter separating the fat and glue liquor from the rendered crushed bone scrap, and further treating the said bone scrap to remove protein matter therefrom, the improvement which comprises: submerging the said crushed bone scrap containing components rich in calcium phosphate and protein matter having a specific gravity greater than water in a classifying zone containing a liquid aqueous medium; maintaining the entire contents of the classifying zone in a state of continuous, vigorous agitation by providing an upward flow of gaseous fluid in said classifying zone, the major proportion of the said protein matter being suspended in the said upper zone without suspending more than a minor proportion of the components rich in calcium phosphate; decanting the suspended protein matter from the upper portion of the classifying zone; and collecting the components rich in calcium phosphate remaining in the lower portion of the classifying zone.

MARION D. SANDERS.

REFERENCES CITED

The following references are of record in the file of this patent:

UNITED STATES PATENTS

| Number | Name | Date |
| --- | --- | --- |
| 1,139,024 | Frank | May 11, 1915 |
| 1,269,189 | Kadish | June 11, 1918 |
| 1,286,554 | Dekker | Dec. 3, 1918 |
| 1,905,945 | Machen | Apr. 25, 1933 |
| 2,281,609 | Walter | May 5, 1942 |

FOREIGN PATENTS

| Number | Country | Date |
| --- | --- | --- |
| 1,915 | Great Britain | 1859 |
| 3,696 | Great Britain | 1872 |